United States Patent
Chen

(10) Patent No.: US 10,040,410 B2
(45) Date of Patent: Aug. 7, 2018

(54) VEHICULAR STARTER BATTERY MANAGEMENT SYSTEM

(71) Applicant: Fu-Chieh Chen, Taichung (TW)

(72) Inventor: Fu-Chieh Chen, Taichung (TW)

( * ) Notice: Subject to any disclaimer, the term of this patent is extended or adjusted under 35 U.S.C. 154(b) by 204 days.

(21) Appl. No.: 15/213,403

(22) Filed: Jul. 19, 2016

(65) Prior Publication Data

US 2017/0334376 A1   Nov. 23, 2017

(30) Foreign Application Priority Data

May 18, 2016  (TW) .............................. 105207306 U

(51) Int. Cl.
*B60R 16/03* (2006.01)
*H02J 7/14* (2006.01)

(52) U.S. Cl.
CPC ............ *B60R 16/03* (2013.01); *H02J 7/1438* (2013.01)

(58) Field of Classification Search
None
See application file for complete search history.

(56) References Cited

U.S. PATENT DOCUMENTS

| | | | | |
|---|---|---|---|---|
| 2009/0147427 A1* | 6/2009 | Levinas | .................. | B60R 16/03 361/170 |
| 2016/0201634 A1* | 7/2016 | Kim | .................... | F02N 11/0862 320/136 |

FOREIGN PATENT DOCUMENTS

| | | | | |
|---|---|---|---|---|
| WO | WO 2005102799 A1 | * | 11/2005 | ............. B60R 25/04 |
| WO | WO 2013179208 A1 | * | 12/2013 | ............. G08C 17/02 |

* cited by examiner

*Primary Examiner* — Daniel Kessie
*Assistant Examiner* — Swarna N Chowdhuri

(57) ABSTRACT

A vehicular starter battery management system includes a detection unit, a processing unit, a control unit, a discharging circuit and a communication unit. The detection unit, the control unit, and the communication unit are coupled respectively with the processing unit. The discharging circuit is coupled with the control unit. The detection unit includes a static detection circuit and a dynamic detection circuit. The static detection circuit includes a micro current detection circuit, an anti-theft detection circuit and a static voltage detection circuit. The dynamic detection circuit includes a dynamic voltage detection circuit, a dynamic current detection circuit and a temperature detection circuit. The processing unit transmits a signal to the control unit and the communication unit based upon the current intensity, the voltage, the temperature and the time at which the battery management system enters into the static mode, detected by the detection unit, thereby operating the control unit to protect the vehicular starter battery. The processing unit uses the communication unit to transmit a signal to and receive a signal from a hand-held communication device equipped with an application.

5 Claims, 2 Drawing Sheets

VEHICULAR STARTER BATTERY MANAGEMENT SYSTEM

BACKGROUND OF THE INVENTION a) Field of the Invention

The present invention relates to a starter battery which provides a car or a motorcycle with the power needed to operate a starter motor, and more particularly to a vehicular starter battery management system.

b) Description of the Prior Art

A starter battery of a vehicle like a car or a motorcycle is a kind of secondary battery which can be recharged and discharged. The starter battery provides the power needed to operate a starter motor, allowing the starter motor to operate and activate an engine. When a vehicle engine is not operating, the starter battery will provide electricity to all kinds of vehicular electronic and electric equipment, such as a car lamp or a vehicle ECU (Electronic Control Unit). On the other hand, when the vehicle engine is running, the engine will drive a generator to operate, producing electricity for the starter battery and the abovementioned vehicular electronic and electric equipment.

The vehicular starter battery installed in a vehicle like a car or a motorcycle includes a power terminal set, an accumulator unit and a battery management unit. The power terminal set is used to connect with an electrical connector terminal of the vehicle, and the accumulator unit is formed by connecting plural lithium-iron-phosphate battery cores serially or parallel to accumulate the power. The power terminal set and the accumulator unit are coupled together by the battery management unit which is formed primarily by an electronic circuit. The battery management unit includes a charging circuit and a discharging circuit, the charging circuit and the discharging circuit are connected together parallel and are connected respectively with the power terminal set and the accumulator unit. The power generated by the generator recharges the accumulator unit through the charging circuit, and the power of the accumulator unit discharges to an exterior of the vehicular starter battery through the discharging circuit, so as to supply electricity to the vehicular electronic and electric equipment. By changing the on/off states of the charging circuit and the discharging circuit, the battery management unit manages the charging and discharging of the accumulator unit, preventing the accumulator unit from being recharged excessively or discharged excessively.

When the vehicle engine is not running, the starter battery will provide the electricity to all kinds of vehicular electronic and electric equipment, such as a car lamp or an ECU. On the other hand, if the vehicle engine has not been activated or operating for a long time, the power accumulated in the accumulator unit will be consumed gradually and will not be supplemented. If the electricity stored in the lithium-iron-phosphate battery cores reaches to a lower safety limit, then the activity of the lithium-iron-phosphate battery cores will be affected, which reduces the lifetime of use and the effective storage capacity of the lithium-iron-phosphate battery cores. In addition, it will not be able to provide the vehicle with the power needed to operate the starter motor to activate the engine, and the vehicle engine will not be activated.

SUMMARY OF THE INVENTION

The primary object of the present invention is to provide a vehicular starter battery management system. The said battery management system is used to protect an accumulator unit of the vehicular starter battery.

To achieve the object of the present invention, the present invention relates a vehicular starter battery management system including, in combination, a battery management system which is coupled with a power terminal set and an accumulator unit of the vehicular starter battery to manage the recharging and discharging of the accumulator unit, wherein the battery management system includes a detection unit, a processing unit, a control unit, a discharging circuit and a communication unit, with that the detection unit, the control unit and the communication unit are coupled with the processing unit respectively, whereas the discharging circuit is coupled with the control unit; that the detection unit includes a static detection circuit and a dynamic detection circuit, the static detection circuit contains a micro current detection circuit, an anti-theft detection circuit and a static voltage detection circuit, wherein a precise value and a minimum detection value of the current intensity that the micro current detection circuit detects are 1 mA respectively; that when the battery management system is at a static mode, the micro current detection circuit detects the discharge current intensity of the accumulator unit and the static voltage detection circuit detects the voltage of the accumulator unit; that when the battery management system is at the anti-theft state, the anti-theft detection circuit detects the discharge current intensity of the accumulator unit; that the dynamic detection circuit includes a dynamic voltage detection circuit, a dynamic current detection circuit and a temperature detection circuit, wherein when the battery management system is at a dynamic mode, the dynamic voltage detection circuit detects the voltage of the accumulator unit, the dynamic current detection circuit detects the discharge current intensity of the accumulator unit, and the temperature detection circuit detects the ambient temperature; that the processing unit is a microprocessor which transmits a signal to the control unit and the communication unit respectively to operate the control unit, based upon the current intensity, the voltage, the temperature and the time at which the battery management system enters into the static mode, which are detected by the detection unit; that the control unit includes a static circuit and a dynamic circuit, wherein the static circuit is coupled with the power terminal set and the accumulator unit, allowing the accumulator unit to discharge to the power terminal set through the static circuit which is provided with a circuit switch to control the on/off state of the static circuit; that the dynamic circuit includes a first circuit, a second circuit, a third circuit and a fourth circuit, wherein the first circuit and the second circuit are coupled respectively with the power terminal set and the accumulator unit that an external power recharges the accumulator unit through the first circuit and the accumulator unit discharges to the power terminal set through the second circuit, the third circuit and the fourth circuit are connected parallel and are coupled respectively with the discharging circuit and the accumulator unit that the accumulator unit discharges to the discharging circuit through the third circuit or the fourth circuit, the first circuit, the second circuit, the third circuit and the fourth circuit are provided respectively with a circuit switch, and each circuit switch controls the on/off of the first circuit, the second circuit, the third circuit and the fourth circuit respectively; that the discharging circuit is a power consumption circuit which is used to consume the power of the accumulator unit; and that the communication unit is a Bluetooth transceiver and the processing unit uses the communication unit to transmit a signal to and receives a signal from a hand-held communication device which is equipped with an application, thereby accessing the voltage, the discharge current intensity and the ambient temperature of the accumulator unit from the communication device to operate the battery management system.

Preferably, the battery management system further includes a changeover switch which is coupled with the processing unit, with that the changeover switch is a manual circuit switch to change the battery management system into a static mode or a dynamic mode.

Preferably, the changeover switch is disposed in a driver's cabin of a car or a handle on a motorcycle, and is coupled with the processing unit by a signal line.

Preferably, the battery management system further includes a warning unit which is coupled with the processing unit and is provided with a sounder or an illuminator, with that the warning unit receives a signal transmitted from the processing unit and sends out a warning sound or a warning light.

Preferably, the warning unit is disposed outside the vehicular starter battery and is coupled with the processing unit by a signal line.

When the vehicle is not in use, a detection unit will detect the discharge current intensity of the accumulator unit to determine whether there is an abnormal current leakage problem when the vehicle is in a static condition. On the other hand, if the vehicle has not been used for a long time, then a control unit will stop the discharging of the accumulator unit, allowing the accumulator unit to keep an adequate storage capacity. Therefore, when a user is to start up the vehicle engine, the accumulator unit can provide the vehicle with the power needed to operate the starter motor, thereby increasing the convenience in using the vehicle.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
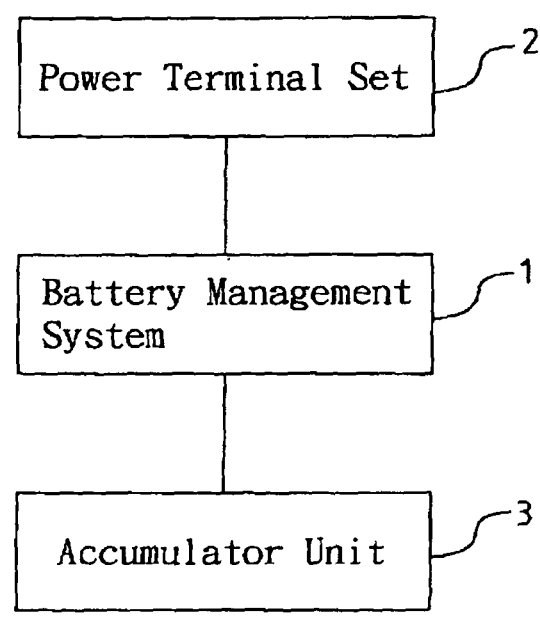
FIG. 1 shows a block diagram of a circuit disposed in a vehicular starter battery, according to an embodiment of the present invention.

Referring to FIG. 1, an embodiment of a vehicular starter battery management system of the present invention includes, in combination, a battery management system 1 which is coupled with a power terminal set 2 and an accumulator unit 3 of the vehicular starter battery to manage the recharging and discharging of the accumulator unit 3.

Figure 2:
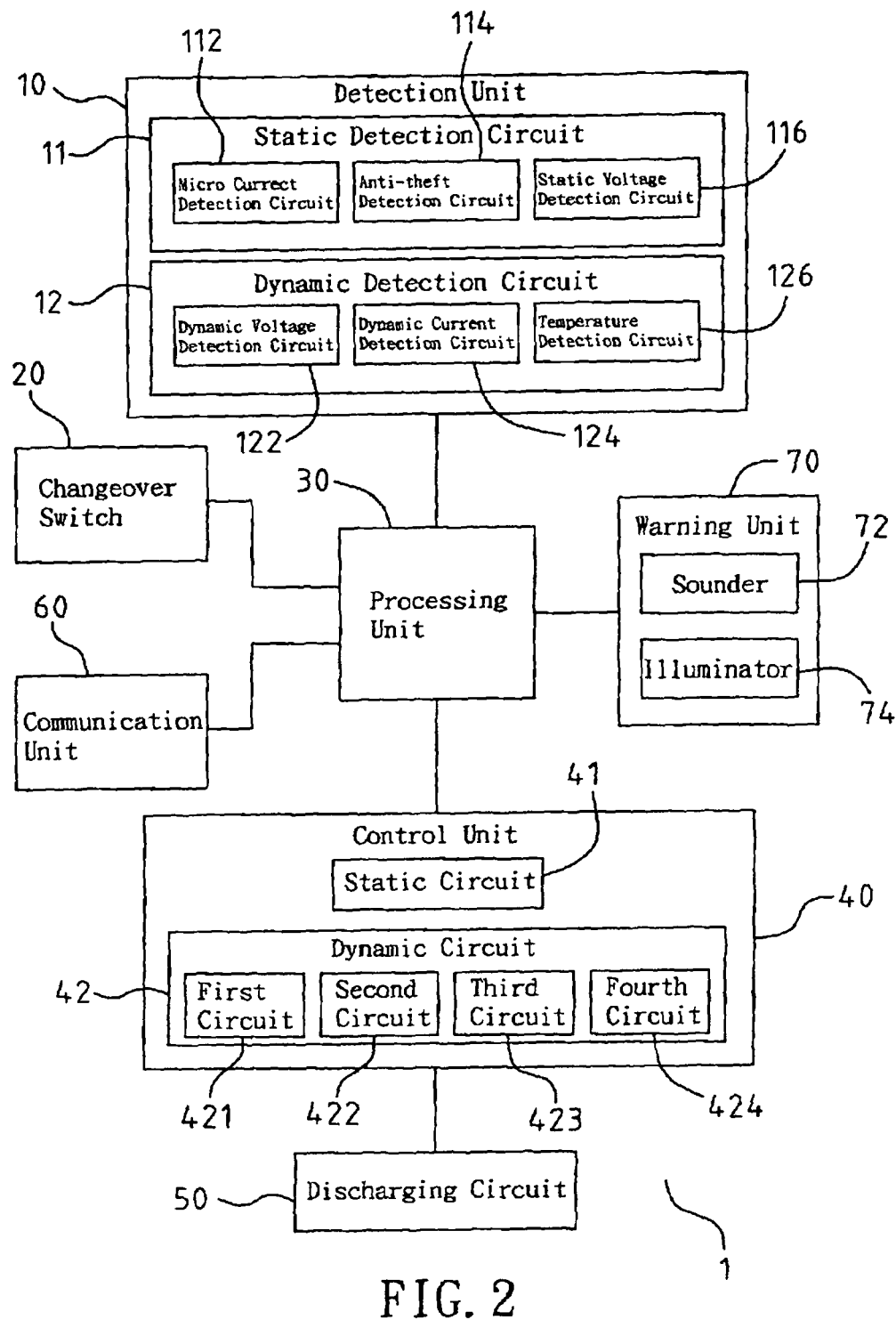
FIG. 2 shows a block diagram of the circuit, according to the embodiment of the present invention.

As shown in FIG. 2, the battery management system 1 includes a detection unit 10, a changeover switch 20, a processing unit 30, a control unit 40, a discharging circuit 50, a communication unit 60 and a warning unit 70, wherein the detection unit 10, the changeover switch 20, the control unit 40, the communication unit 60 and the warning unit 70 are coupled with the processing unit 30 respectively, whereas the discharging circuit 50 is coupled with the control unit 40.

The detection unit 10 includes a static detection circuit 11 and a dynamic detection circuit 12, wherein the static detection circuit 11 contains a micro current detection circuit 112, an anti-theft detection circuit 114 and a static voltage detection circuit 116. A precise value and a minimum detection value of the current intensity that the micro current detection circuit 112 can detect are 1 mA respectively. When the battery management system 1 is at a static mode, the micro current detection circuit 112 detects the discharge current intensity of the accumulator unit 3 and transmits the detected current intensity to the processing unit 30, allowing a user to determine whether there is an abnormal current leakage problem when the vehicle switch is off. On the other hand, when the battery management system 1 is set at an anti-theft state, the anti-theft detection circuit 116 detects the discharge current intensity of the accumulator unit 3 and transmits the detected current intensity to the processing unit 30. At this anti-theft state, the vehicular starter battery provides power to meet the utilization need of the vehicle ECU, and is limited from outputting a large current in collaboration with the control unit 40, which prevents the vehicle engine from being started up forcefully at the anti-theft state to implement the anti-theft function of the vehicle. When the battery management system 1 is at the static mode, the static voltage detection circuit 114 detects the voltage of the accumulator unit 3 and transmits the detected voltage strength to the processing unit 30, allowing the user to determine the storage capacity of the accumulator unit 3.

The dynamic detection circuit 12 contains a dynamic voltage detection circuit 122, a dynamic current detection circuit 124 and a temperature detection circuit 126, wherein when the battery management system 1 is at a dynamic mode, the dynamic voltage detection circuit 122 detects the voltage strength of the accumulator unit 3 and transmits the detected voltage value to the processing unit 30, providing a basis for determining the recharging or discharging state of the accumulator unit 3 and implementing the over-recharging or over-discharging protection of the accumulator unit 3 in collaboration with the control unit 40. When the battery management system 1 is at the dynamic mode, the dynamic current detection circuit 124 detects the discharge current intensity of the accumulator unit 3 and transmits the detected current intensity to the processing unit 30, allowing the user to determine the power efficiency of the accumulator unit 3. At this dynamic mode, the temperature detection circuit 126 detects the ambient temperature and transmits the detected temperature value to the processing unit 30, implementing the high temperature protection function of the accumulator unit 3 in collaboration with the control unit 40 and the discharging circuit 50.

The changeover switch 20 is a manual circuit switch and the user operates the changeover switch 20 to change the battery management system 1 into the static mode or dynamic mode. The changeover switch 20 can be installed in a driver's cabin of a car or a handle on a motorcycle when necessary, and is coupled with the processing unit 30 by a signal line (not shown in the drawings), thereby increasing the user's convenience in operating the changeover switch 20.

The processing unit 30 is a microprocessor and transmits a signal to the control unit 40, the communication unit 60 and the warning unit 70 respectively, based upon the current intensity, the voltage value, the temperature value and the time at which the battery management system 1 enters into the static mode, which are detected by the detection unit 10, such that the control unit 40 can operate in time to protect the vehicular starter battery.

The control unit 40 is used to control the recharging or discharging of the accumulator unit 3. The control unit 40 includes a static circuit 41 and a dynamic circuit 42, wherein the static circuit 41 is coupled with the power terminal set 2 and the accumulator unit 3. When the battery management system 1 is at the static mode, the accumulator unit 3 discharges to the power terminal set 2 through the static circuit 41. Accordingly, when the battery management system 1 is set at the anti-theft state, the vehicular starter battery provides power to meet the utilization need of the vehicle ECU. The static circuit 41 is provided with a circuit switch (not shown in the drawings) to control the on or off of the static circuit 41.

The dynamic circuit 42 includes a first circuit 421, a second circuit 422, a third circuit 423 and a fourth circuit 424, wherein the first circuit 421 and the second circuit 422 are coupled respectively with the power terminal set 2 and the accumulator unit 3. When the battery management system 1 is at the dynamic mode, an external power (such as the power generated by a vehicle generator) recharges the accumulator unit 3 through the first circuit 421, and the accumulator unit 3 discharges to the power terminal set 2 through the second circuit 422, thereby meeting the power required for all kinds of vehicular electronic and electric equipment. The third circuit 423 and the fourth circuit 424 are connected parallel and are coupled respectively with the discharging circuit 50 and the accumulator unit 3, allowing the accumulator unit 3 to discharge to the discharging circuit 50 through the third circuit 423 or the fourth circuit 424. The first circuit 421, the second circuit 422, the third circuit 423 and the fourth circuit 424 are provided respectively with a circuit switch (not shown in the drawings), and each circuit switch is used to control the on or off of the first circuit 421, the second circuit 422, the third circuit 423 and the fourth circuit 424, respectively.

The discharging circuit 50 is a power consumption circuit which is used to consume the power of the accumulator unit 3.

The communication unit 60 is a Bluetooth transceiver, transmitting a signal to and receiving a signal from a hand-held communication device which is equipped with an application (such as a mobile phone which is not shown in the drawings). Accordingly, the processing unit 30 transmits a signal to and receives a signal from that communication device by the communication unit 60, and the user can access the voltage value, the discharge current intensity and the ambient temperature value of the accumulator unit 3 from that communication device, using that communication device to operate the battery management system 1.

The warning unit 70 is an optional part of the battery management system 1; therefore, the battery management system 1 can be provided with the warning unit 70 when necessary. The warning unit 70 includes a sounder 72 or an illuminator 74, receiving the signal transmitted from the processing unit 30 and sending out a warning sound or a warning light in time. Accordingly, when it is determined that there is an anomaly based upon the current intensity, the voltage value and the temperature value detected by the detection unit 10, the processing unit 30 will transmit a signal to the warning unit 70, allowing the warning unit 70 to send out the warning sound or warning light to warn the user. The warning unit 70 can be disposed outside the vehicular starter battery when necessary and is coupled with the processing unit 30 by a signal line (not shown in the drawings) to facilitate installing the warning unit 70 in a driver's cabin of a car or on a dashboard of a motorcycle selectively, thereby increasing the user's convenience in listening the warning sound or reading the warning light.

The detection unit 10 detects the voltage, the discharge current intensity and the ambient temperature of the accumulator unit 3, and transmits the detected data to the processing unit 30. The processing unit 30 compares the abovementioned detected data and transmits a signal to the control unit 40 in time based upon the result of comparison, allowing the control unit 40 to operate in time. The processing unit 30 also transmits a signal to the communication unit 60 based upon the data detected by the detection unit 10. The communication unit 60, then, transmits that signal to a hand-held communication device which is used by the user. Next, the signal received is interpreted by an application loaded in the communication device, and the current intensity, the voltage and the ambient temperature of the accumulator unit 3 are displayed on a screen of the communication device, so that the user can be aware of the status of the vehicular starter battery by the signal transmitted from the communication unit 60 to the hand-held communication device.

The user can operate the changeover switch 20 to enable the vehicular starter battery to enter into the static mode when the vehicle switch is off, and operate the changeover switch 20 to enable the vehicular starter battery to enter into the dynamic mode when the vehicle switch is on. In addition, the user can also choose to use the hand-held communication device to send out an instruction message to the communication unit 60. Then, the communication unit 60 transmits that instruction message to the processing unit 30, so as to operate the battery management system 1 to enable the vehicular starter battery to enter into the static mode or dynamic mode. The changeover switch 20 is an optional part of the battery management system 1 and can improve the convenience and reliability in operating the battery management system 1.

When the user operates the battery management system 1 to enable the vehicular starter battery to enter into the static mode, the operation of the battery management system 1 is described below.

The processing unit 30 transmits a signal to the control unit 40, the static circuit 41 forms a closed path and the dynamic circuit 42 forms an open circuit. The accumulator unit 3 can discharge to the power terminal set 2 through the static circuit 41, but cannot discharge to the power terminal set 2 through the dynamic circuit 42. In addition, an external power cannot recharge the accumulator unit 3 through the dynamic circuit 42. The micro current detection circuit 112 detects the current intensity at which the accumulator unit 3 discharges to the power terminal set 2 through the static circuit 41, and the detected current intensity is IS1. The static voltage detection circuit 114 detects the voltage of the accumulator unit 3 when the vehicular starter battery is at the static mode, and the detected voltage value is VS. The detection unit 10 transmits the current intensity IS1 and the voltage value VS to the processing unit 30, whereas the processing unit 30 transmits the current intensity IS1 and the voltage value VS to the communication unit 60. The communication unit 60 then transmits the current intensity IS1 and the voltage value VS to a hand-held communication device used by the user, so that the user can be aware of the basic power demand for the basic utilization equipment like a vehicle ECU, provided by the vehicular starter battery when the vehicle switch is off and the vehicle is static, by reading the messages displayed on the communication device. In addition, the user can also know whether there is an abnormal current leakage problem and the storage capacity of the accumulator unit 3.

The processing unit 30 compares the time T at which the vehicular starter battery enters into the static mode with a pre-determined open-circuit time T1 which is determined by a basic current intensity I1 and the storage capacity of the accumulator unit 3. The basic current intensity I1 is, on the other hand, determined by the current intensity needed to keep the vehicle ECU operating effectively when the vehicle switch is off.

When T is larger than or equal to T1, the processing unit 30 transmits a signal to the control unit 40 and the communication unit 60. Based upon the signal of the processing unit 30, the control unit 40 enables the circuit switch of the static circuit 41 to be off and the static circuit 41 to form an open circuit. The accumulator unit 3, then, is unable to output a current to the power terminal set 2 through the static circuit 41. Accordingly, under the static mode, if the battery management system 1 keeps at the static mode for a period of the pre-determined open circuit time T1, then the static circuit 41 will form an open circuit and the accumulator unit 3 cannot continue to discharge outward. Therefore, the accumulator unit 3 can keep the storage capacity that is sufficient to activate and operate the vehicular starter motor for N times, avoiding that the accumulator unit 3 is unable to access an external power generated by the vehicle generator for recharging under a condition that the vehicle has not been started for a long time. As the power accumulated in the accumulator unit 3 is consumed continuously, when the user is to use the vehicle, the storage capacity of the accumulator unit 3 will not be able to meet the power demand for operating the vehicular starter motor, causing a trouble that the user cannot start up the vehicle engine. In addition, N is a positive integer from 1 to 3.

After the vehicular starter battery enters into the static mode, the user can use the communication device to operate the battery management system 1, allowing the vehicular starter battery to further enter into an anti-theft state. When the vehicular starter battery enters into the anti-theft state, in addition to that the abovementioned micro current detection circuit 112 and static voltage detection circuit 114 will keep detecting to get the current intensity IS1 and the voltage value VS, the anti-theft detection circuit 116 will also detect the current intensity at which the accumulator unit 3 discharges to the power terminal set 2 through the static circuit 41. The detected current intensity is IS2; whereas, the difference between IS1 and IS2 is that the precision of IS1 is better than that of IS2, and the minimum value of IS1 is 1 mA. Therefore, by IS1, the user can be aware of the abnormal current leakage problem very reliably and precisely.

The processing unit 30 compares the current intensity IS2 with the pre-determined basic current intensity I1.

When IS2 is smaller than or equal to I1, the static circuit 41 will keep on, and the accumulator unit 3 can output a current to the power terminal set 2 through the static circuit 41, avoiding that the vehicle ECU restores to the factory settings due to the lack of power supply.

On the other hand, when IS2 is larger than I1, the processing unit 30 transmits a signal to the control unit 40, the communication unit 60 and the warning unit 70. Based upon the signal of the processing unit 30, the control unit 40 enables the circuit switch of the static circuit 41 to be off and the static circuit 41 to form an open circuit. Therefore, the accumulator unit 3 cannot output a current to the power terminal set 2 through the static circuit 41. The communication unit 60 transmits a wireless signal outward, allowing the user to be aware of the status of the vehicular starter battery by the communication device. Based upon the signal of the processing unit 30, the warning unit 70 enables the sounder 72 or the illuminator 74 to operate and sends out a warning sound or a warning light to remind the user of. Accordingly, at the anti-theft state, the accumulator unit 3 can only output a small current in intensity lower than or equal to the basic current intensity I1 through the static circuit 41, and is limited from outputting a large current in intensity higher than the basic current intensity I1. When someone is to start up the vehicle engine forcefully without releasing from the anti-theft state first, as the vehicular starter battery needs to output a large current which is sufficient to operate the vehicular starter motor that the starter motor can operate, and when IS2 is larger than I1, due to that the static circuit 41 has formed an open circuit, the starter motor will not be able to operate and the engine cannot be started up, which prevents the vehicle from being stolen.

When the user operates the battery management system 1 to enable the vehicular starter battery to enter into the dynamic mode, the operation of the battery management system 1 is described below.

The processing unit 30 transmits a signal to the control unit 40, the static circuit 41 forms an open circuit, the first circuit 421 and the second circuit 422 form a closed path, and the third circuit 423 and the fourth circuit 424 form an open circuit. The accumulator unit 3 can discharge to the power terminal set 2 through the second circuit 422, but cannot discharge to the discharging circuit 50 through the third circuit 423 or the fourth circuit 424, or discharge to the power terminal set 2 through the static circuit 41. However, an external power can recharge the accumulator unit 3 through the first circuit 421. The dynamic voltage detection circuit 122 detects the voltage of the accumulator unit 3, and the detected voltage value is VM. The dynamic current detection circuit 124 detects the current intensity at which the accumulator unit 3 discharges to the power terminal set 2 through the second circuit 422, and the detected current intensity is IM. The temperature detection circuit 126 detects the ambient temperature and the detected temperature value is TEMP. The detection unit 10 also transmits the voltage value VM, the current intensity IM and the temperature value TEMP to the processing unit 30, the processing unit 30 transmits the voltage value VM, the current intensity IM and the temperature value TEMP to the communication unit 60, and the communication unit 60 transmits the voltage value VM, the current intensity IM and the temperature value TEMP to the hand-held communication device used by the user, so that the user can be aware of the status of the vehicular starter battery 3 when the vehicle switch is on, by reading the messages displayed on the communication device.

The processing unit 30 compares the voltage value VM with a pre-determined first safe high voltage V1, a second safe high voltage V2, and a safe low voltage V3 respectively, with V3 smaller than V2 and V2 smaller than V1. The ambient temperature value TEMP is compared with a pre-determined safe temperature value TEMP1.

When VM is smaller than V3 and TEMP is smaller than TEMP1, the processing unit 30 transmits a signal to the control unit 40 and the warning unit 70 respectively. Based upon the signal of the processing unit 30, the control unit 40 enables the circuit switch of the second circuit 422 to be off and the second circuit 422 to form an open circuit. Therefore, the accumulator unit 3 cannot output a current to the power terminal set 2 through the second circuit 422, which prevents the accumulator unit 3 from being damaged by discharging excessively, thereby implementing the over-discharging protection function. Based upon the signal of the processing unit 30, the warning unit 70 enables the sounder 72 or the illuminator 74 to operate and sends out a warning sound or a warning light to remind the user of.

When VM is smaller than V3 that allows the second circuit 422 to form an open circuit, the voltage of the accumulator unit 3 rises up, which enables VM to be larger than or equal to V3. The processing unit 30 then transmits a signal to the control unit 40 and the warning unit 70 respectively. Based upon the signal of the processing unit 30, the control unit 40 enables the circuit switch of the second circuit 422 to be on and the second circuit 422 to be restored to the on-state. Therefore, the accumulator unit 3 can output a current to the power terminal set 2. Based upon the signal of the processing unit 30, the warning unit 70 enables the sounder 72 or the illuminator 74 to stop operating, and ceases to send out a warning sound or a warning light.

When V3 is smaller than VM, VM is smaller than V2 and TEMP is smaller than TEMP1, the first circuit 421 and the second circuit 422 form a closed path, and the third circuit 423 and the fourth circuit 424 form an open circuit. The accumulator unit 3 can discharge to the power terminal set 2 through the second circuit 422, but cannot discharge to the discharging circuit 50 through the third circuit 423 or the fourth circuit 424. However, an external power can recharge the accumulator unit 3 through the first circuit 421, and the accumulator unit 3 can discharge to the power terminal set 2 through the second circuit 422.

When V2 is smaller than or equal to VM, VM is smaller than V1 and TEMP is smaller than TEMP1, the processing unit 30 transmits a signal to the control unit 40 and the warning unit 70 respectively. Based upon the signal of the processing unit 30, the circuit switch of the first circuit 421 is off and the first circuit 421 forms an open circuit. An external power cannot recharge the accumulator unit 3 through the first circuit 421, which prevents the accumulator unit 3 from being damaged by recharging excessively, thereby implementing the over-charging protection function. Based upon the signal of the processing unit 30, the warning unit 70 enables the sounder 72 or the illuminator 74 to operate and sends out a warning sound or a warning light to remind the user of.

When V2 is smaller than or equal to VM and VM is smaller than V1 which allows the first circuit 421 to form an open circuit, and the voltage of the accumulator unit 3 drops down which allows V3 to be smaller than VM and VM to be smaller than V2, the processing unit 30 transmits a signal to the control unit 40 and the warning unit 70 respectively. Based upon the signal of the processing unit 30, the circuit switch of the first circuit 421 is on, and the first circuit 421 is restored to an on-state. An external power can recharge the accumulator unit 3 through the first circuit 421. Based upon the signal of the processing unit 30, the warning unit 70 enables the sounder 72 or the illuminator 74 to stop operating and ceases to send out a warning sound or a warning light.

When VM is larger than or equal to V1 and TEMP is smaller than TEMP1, the processing unit 30 transmits a signal to the control unit 40. Based upon the signal of the processing unit 30, the circuit switch of the second circuit 422 is off, and the second circuit 422 forms an open circuit. Therefore, the accumulator unit 3 cannot output a current to the power terminal set 2 through the second circuit 422, the circuit switch of the third circuit 423 is on, and the third circuit 423 forms a closed path. The accumulator unit 3 discharges to the discharging circuit 50 through the third circuit 423, and by consuming the power of the accumulator unit 3 with the discharging circuit 50, the accumulator unit 3 can be prevented from being damaged due to too high a voltage, thereby implementing the over-voltage protection function.

When VM is larger than or equal to V1 that allows the third circuit 423 to form a closed path, and the voltage of the accumulator unit 3 drops down that allows VM to be smaller than V1, the processing unit 30 transmits a signal to the control unit 40 and the warning unit 70 respectively. Based upon the signal of the processing unit 30, the circuit switch of the third circuit 423 is off and the third circuit 423 is restored to the off-state. Therefore, the accumulator unit 3 cannot discharge to the discharging circuit 50 through the third circuit 423, the circuit switch of the second circuit 422 is on and the second circuit 422 is restored to the on-state. The accumulator unit 3 can output a current to the power terminal set 2 through the second circuit 422, which ends the over-voltage protection function.

When TEMP is larger than or equal to TEMP1 without regarding the magnitude of VM, the processing unit 30 transmits a signal to the control unit 40 and the warning unit 70 respectively. Based upon the signal of the processing unit 30, the circuit switch of the first circuit 421 and the second circuit 422 is off respectively. An external power cannot recharge the accumulator unit 3 through the first circuit 421, and the accumulator unit 3 cannot output a current to the power terminal set 2 through the second circuit 422. The circuit switch of the fourth circuit 424 is on and the fourth circuit 424 forms a closed path. The accumulator unit 3 discharges to the discharging circuit 50 through the fourth circuit 424, and by consuming the power of the accumulator unit 3 with the discharging circuit 50, the accumulator unit 3 can be prevented from being damaged due to too high the ambient temperature, thereby implementing the high temperature protection function. Based upon the signal of the processing unit 30, the warning unit 70 enables the sounder 72 or the illuminator 74 to operate and sends out a warning sound or a warning light to remind the user of.

When TEMP is larger than or equal to TEMP1 that allows the first circuit 421 and the second circuit 422 to form an open circuit, the fourth circuit 424 forms a closed path, and the ambient temperature drops down that allows TEMP to be smaller than TEMP1, the processing unit 30 transmits a signal to the control unit 40 and the warning unit 70 respectively. Based upon the signal of the processing unit 30, the circuit switch of the fourth circuit 424 is off and the fourth circuit 424 is restored to the off-state. Therefore, the accumulator unit 3 cannot output a current to the discharging circuit 50 through the fourth circuit 424, which ends the high temperature protection function. Depending upon the relative relationship among the voltage value VM, the second safe high voltage V2 and the safe low voltage V3, when V3 is smaller than VM and VM is smaller than V2, the first circuit 421 will be restored to the on-state, and an external power can recharge the accumulator unit 3 through the first circuit 421. On the other hand, when VM is larger than or equal to V3, the second circuit 422 will be restored to an on-state, and the accumulator unit 3 can output a current to the power terminal set 2 through the second circuit 422.

Based upon the signal of the processing unit 30, the warning unit 70 enables the sounder 72 or the illuminator 74 to stop operating, and ceases to send out a warning sound or a warning light.

It is worthy of mentioning that when the vehicle is not in use, the vehicular starter battery can enter into the static mode. The static detection circuit 11 detects the discharge current intensity of the accumulator unit 3, allowing the user to determine whether the current is consumed too much when the vehicle is static, so as to inspect and repair the vehicle for the abnormal current leakage problem in time, thereby protecting the vehicular starter battery. In addition, if the vehicle has not been used for a long time, the control unit 40 can stop the discharging of the accumulator unit 3, so that a proper storage capacity can be reserved for the accumulator unit 3. When the user is to start up the vehicle engine, the accumulator unit 3 is able to provide the power needed to operate the vehicular starter motor, and then the user can start up the vehicle engine. After the vehicle engine starts, the generator can be driven to operate to recharge the vehicular starter battery, and the user can drive the vehicle to a vehicle repair shop for the necessary inspecting and repairing, which improves the convenience in using the vehicle and prevents from that the vehicle cannot be started up and the user needs to use an external emergency rescue service (such as towing or an external rescue battery) to restore the vehicle to a condition of use, due to that the storage capacity of the accumulator unit 3 is too low. On the other hand, when the vehicle is in use, the vehicular starter battery can enter into the dynamic mode, and by detecting the voltage value VM and the ambient temperature value TEMP of the accumulator unit 3, the over-voltage protection function and the high temperature protection function can be executed in time.

The battery management system 1 can be applied to a variety of vehicular starter battery, such as, but not limited to, a lithium-iron-phosphate battery, a lithium-manganese dioxide battery or a lead-acid battery.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A vehicular starter battery management system including, a battery management system which is coupled with a power terminal set and a vehicular starter battery to manage recharging and discharging of the vehicular starter battery, wherein the battery management system includes a detection unit, a processing unit, a control unit, a discharging circuit and a communication unit;

wherein the detection unit, the control unit and the communication unit are coupled with the processing unit, the discharging circuit is coupled with the control unit;

wherein the detection unit includes a static detection circuit and a dynamic detection circuit, the static detection circuit contains a micro current detection circuit, an anti-theft detection circuit and a static voltage detection circuit, wherein a precise value and a minimum detection value of the current intensity that the micro current detection circuit detects is 1 mA;

wherein when the battery management system is at a static mode, the micro current detection circuit detects a discharge current intensity of the vehicular starter battery and the static voltage detection circuit detects the voltage of the vehicular starter battery;

wherein when the battery management system is at an anti-theft state, the anti-theft detection circuit detects the discharge current intensity of the vehicular starter battery;

wherein the dynamic detection circuit includes a dynamic voltage detection circuit, a dynamic current detection circuit and a temperature detection circuit, wherein when the battery management system is at a dynamic mode, the dynamic voltage detection circuit detects the voltage of the vehicular starter battery, the dynamic current detection circuit detects the discharge current intensity of the vehicular starter battery, and the temperature detection circuit detects temperature;

wherein the processing unit is a microprocessor which transmits a signal to the control unit and the communication unit respectively to operate the control unit, based upon the current intensity, the voltage, the temperature and the time at which the battery management system enters into the static mode, which are detected by the detection unit;

wherein the control unit includes a static circuit and a dynamic circuit, wherein the static circuit is coupled with the power terminal set and the vehicular starter battery, allowing the vehicular starter battery to discharge to the power terminal set through the static circuit which is provided with a circuit switch to control the on/off state of the static circuit;

wherein the dynamic circuit includes a first switch, a second switch, a third switch and a fourth switch, wherein the first switch and the second switch are coupled respectively to the power terminal set and the vehicular starter battery such that an external power recharges the vehicular starter battery through the first switch and the vehicular starter battery discharges to the power terminal set through the second switch;

the third switch and the fourth switch are connected parallel and are coupled respectively with the discharging circuit and the vehicular starter battery such that the vehicular starter battery discharges to the discharging circuit through the third switch or the fourth switch;

wherein the discharging circuit is a power consumption circuit which is used to consume the power of the vehicular starter battery; and wherein the communication unit is a transceiver and the processing unit uses the communication unit to transmit a signal to and receives a signal from a hand-held communication device which is equipped with an application, thereby accessing the voltage, the discharge current intensity and the temperature of the vehicular starter battery from the communication device to operate the battery management system.

2. The vehicular starter battery management system according to claim 1, wherein the battery management system further includes a changeover switch which is coupled with the processing unit, with that the changeover switch is a manual circuit switch to change the battery management system into a static mode or a dynamic mode.

3. The vehicular starter battery management system according to claim 2, wherein the changeover switch is disposed in a driver's cabin of a car or a handle on a motorcycle, and is coupled with the processing unit by a signal line.

4. The vehicular starter battery management system according to claim 1, wherein the battery management system further includes a warning unit which is coupled with the processing unit and is provided with a sounder or an illuminator, with that the warning unit receives a signal transmitted from the processing unit and sends out a warning sound or a warning light.

5. The vehicular starter battery management system according to claim 4, wherein the warning unit is disposed outside the vehicular starter battery and is coupled with the processing unit by a signal line.

* * * * *